United States Patent
Ko et al.

(10) Patent No.: US 8,497,045 B2
(45) Date of Patent: Jul. 30, 2013

(54) PURGE SYSTEM FOR FUEL CELL WITH IMPROVED COLD START PERFORMANCE

(75) Inventors: Jae Jun Ko, Gyeonggi-do (KR); Nam Woo Lee, Gyeonggi-do (KR); Young Min Kim, Gyeonggi-do (KR); Sang Uk Kwon, Gyeonggi-do (KR); Ik Jae Son, Gyeonggi-do (KR); Woo Suk Sung, Gyeonggi-do (KR); Jong Hyun Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 190 days.

(21) Appl. No.: 12/872,313

(22) Filed: Aug. 31, 2010

(65) Prior Publication Data
US 2011/0097637 A1    Apr. 28, 2011

(30) Foreign Application Priority Data
Nov. 26, 2009    (KR) ................. 10-2009-0115435

(51) Int. Cl.
*H01M 8/04*    (2006.01)
(52) U.S. Cl.
USPC ............ 429/443; 429/428; 429/429; 429/444
(58) Field of Classification Search
USPC ................... 429/428, 443, 444, 429
See application file for complete search history.

(56) References Cited

U.S. PATENT DOCUMENTS

| | | | | |
|---|---|---|---|---|
| 2007/0087239 A1* | 4/2007 | Mulvenna et al. | | 429/26 |
| 2008/0245588 A1* | 10/2008 | Wake et al. | | 180/65.3 |
| 2009/0148728 A1* | 6/2009 | Fujita | | 429/13 |
| 2010/0261079 A1* | 10/2010 | Kells et al. | | 429/429 |

FOREIGN PATENT DOCUMENTS

| | | |
|---|---|---|
| JP | 2005093110 A | 4/2005 |
| JP | 2007012453 A | 1/2007 |
| JP | 2007173158 A | 7/2007 |
| JP | 2008-243565 A | 10/2008 |
| KR | 10-2001-0056026 | 7/2001 |
| KR | 10-2004-0045349 | 6/2004 |
| KR | 10-2008-0008119 | 1/2008 |

* cited by examiner

*Primary Examiner* — Zachary Best
(74) *Attorney, Agent, or Firm* — Edwards Wildman Palmer LLP; Peter F. Corless (57) ABSTRACT

The present invention provides a purge system for a fuel cell, which can reduce the time required to thaw a frozen valve during cold start-up and reduce the whole start-up time, thus improving the cold start performance. In preferred embodiments, the present invention provides a purge system for a fuel cell with improved cold start performance, the system preferably including a main pipe connected to a purge gas outlet of a fuel cell stack to discharge a purge gas purging the fuel cell stack and impurities; an auxiliary pipe branched from the main pipe; a purge valve installed in each of the main pipe and the auxiliary pipe to perform an purge operation; a cut-off valve installed at an upstream side of the purge valve in the auxiliary pipe; and a controller for controlling the operation of the purge valves and the cut-off valve.

8 Claims, 5 Drawing Sheets

PURGE SYSTEM FOR FUEL CELL WITH IMPROVED COLD START PERFORMANCE

CROSS-REFERENCE TO RELATED APPLICATION

This application claims under 35 U.S.C. §119(a) the benefit of Korean Patent Application No. 10-2009-0115435 filed Oct. 26, 2009, the entire contents of which are incorporated herein by reference.

BACKGROUND (a) Technical Field

The present disclosure relates, generally, to a fuel cell system. More particularly, it relates to a purge system for a fuel cell, which can reduce the time required to thaw a frozen valve during cold start-up and reduce the whole start-up time, thus improving the cold start performance.

(b) Background Art

A typical fuel cell system in a hydrogen fuel cell vehicle comprises a fuel cell stack for generating electrical energy by an electrochemical reaction of reactant gases, a hydrogen supply system for supplying hydrogen as a fuel to the fuel cell stack, an air supply system for supplying air containing oxygen as an oxidant required for the electrochemical reaction in the fuel cell stack, a thermal management system (TMS) for removing reaction heat from the fuel cell stack to the outside of the fuel cell system, controlling operation temperature of the fuel cell stack, and performing water management function, and a system controller for controlling overall operation of the fuel cell system.

Preferably, the hydrogen supply system includes a hydrogen tank, high-pressure and low-pressure regulators, a hydrogen valve, a hydrogen recirculation system, etc., and the air supply system includes an air blower, an air valve, a humidifier, etc., and the TMS includes a coolant pump, a radiator, etc.

Preferably, in the hydrogen supply system, high pressure hydrogen supplied from the hydrogen tank sequentially passes through the high-pressure and low-pressure regulators and then is supplied to the fuel cell stack at a low pressure. In the hydrogen recirculation system, a blower provided in a recirculation line recirculates unreacted hydrogen of an anode ("fuel electrode" or "hydrogen electrode") of the fuel cell stack to the anode, thus recycling the hydrogen.

In the air supply system, dry air supplied by the air blower passes through the humidifier to be humidified by absorbing water from exhaust gas (wet air) discharged from a cathode ("air electrode" or "oxygen electrode") of the fuel cell stack and then is supplied to the cathode of the fuel cell stack.

An urgent and important consideration of a fuel cell vehicle is to improve cold start performance. When the fuel cell system is exposed to sub-zero temperatures for a long time, water present in various components of the system such as valves as well as the fuel cell stack is frozen, which makes it difficult to start the vehicle.

Water is produced by the electrochemical reaction of reactant gases in a polymer electrolyte membrane fuel cell (PEMFC) applied to the fuel cell vehicle, and thus the water is collected in the fuel cell stack, pipes connected to the fuel cell stack, and various components mounted in the pipes.

Therefore, when the outside air temperature falls below zero, the water present in the fuel cell stack and other components is frozen, and thus an external heat source is required to melt the ice in order to start the vehicle afterwards.

However, when the ice is melted by heat from the external heat source, it takes varying amounts of time to completely thaw the individual components according to the temperature and weight of each component and the amount of water present in each component.

In particular, since it is impossible to operate the fuel cell system before several components that are important for the operation of the fuel cell are thawed, it is very important to thaw the key components as soon as possible during cold start-up in order to reduce the start-up time.

In the case of the valves, an air cut-off valve, a hydrogen recirculation valve, a hydrogen purge valve, etc. are always exposed to a wet environment during operation of the fuel cell, and thus the valves are frozen at a temperature below the freezing point. Accordingly, it is necessary to thaw the valves using a heater during the cold start-up.

For this purpose, a heating system such as a positive temperature coefficient (PTC) heater, which is operated by electric power supplied from a battery, is preferably provided in the valves to thaw the valves to be normally operated during the cold start-up.

Figure 1:
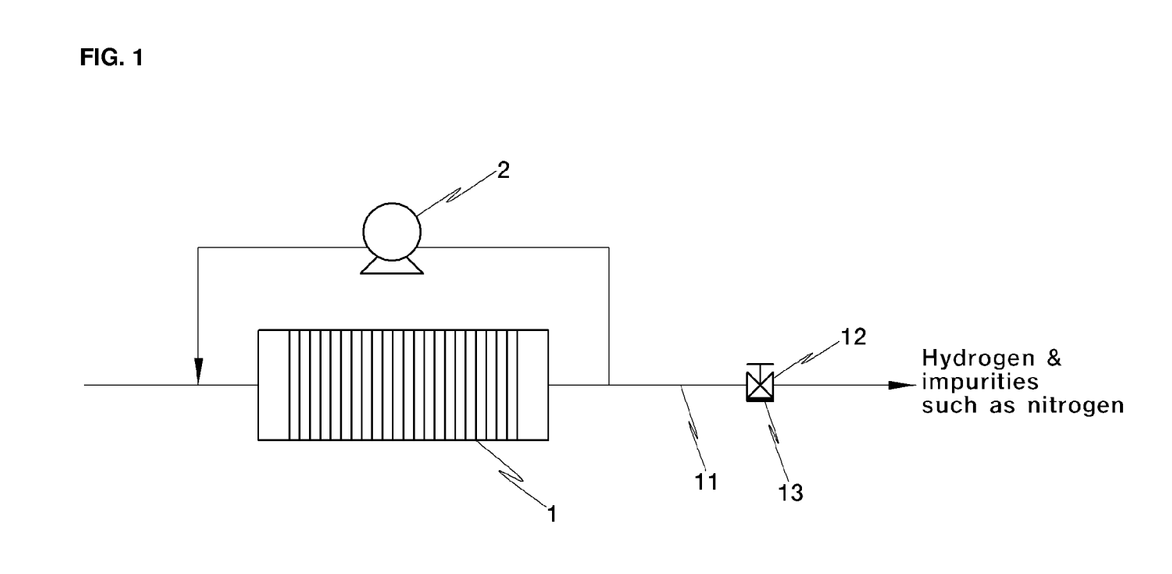
FIG. 1 is a schematic diagram of a purge system in which a hydrogen purge valve is installed at an anode outlet of a fuel cell stack.

FIG. 1 is a schematic diagram of a purge system in which a hydrogen purge valve is suitably installed at an anode outlet of a fuel cell stack.

Preferably, the hydrogen purge valve 12 is an electronic valve, which is opened and closed in response to a control signal of a controller to control the hydrogen concentration in the fuel cell stack 1, through which hydrogen is used to remove impurities such as water, nitrogen, etc. present in the fuel cell stack 1 and to increase hydrogen utilization.

The hydrogen purge valve 12 is in a closed state while the operation of the fuel cell stack 1 is stopped after shut-down and then is opened to exchange the gas in an anode channel to hydrogen during start-up of the vehicle. Unlike a hydrogen supply valve located in a position where dry hydrogen is supplied and operated immediately without a thawing process, the hydrogen purge valve 12 is preferably located at the outlet of the fuel cell stack 1, and thus water is always present in the hydrogen purge valve 12 during operation of the fuel cell system.

Accordingly, when the fuel cell system is exposed to a cold environment, for example during the winter, the water present in the valves is frozen, and the valve is not operated due to ice. Therefore, various methods are used to allow the valves to be freely opened during the cold start-up.

In one exemplary method that allows the valve to be opened at a temperature below the freezing point, a heater configured to surround the valve is used to thaw the valve as mentioned above. In this case, it takes a long time to thaw the ice present in the valve, which leads to an increase in the start-up time.

In another exemplary method, a valve using an impact column is used, in which an impact is suitably applied to the inside of the valve such that the ice is split and melted or discharged to the outside. This method also requires time of about several tens of seconds to open the valve, which causes a delay in the start-up and, especially, reduces the durability of the valve.

Further, another method comprises continuously heating the valve so as not to be frozen, in which a heater surrounding the outside of the valve is continuously operated even after the operation of the fuel cell system is stopped during the winter such that the water present in the valve is not frozen. However, since the electric power of a battery is used to operate the heater, the battery may be discharged when the fuel cell system is exposed to low temperatures for a long time.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a purge system for a fuel cell, which can reduce the time required to thaw a frozen valve during cold start-up and reduce the whole start-up time, thus improving the cold start performance.

In a preferred embodiment, the present invention provides a purge system for a fuel cell with suitably improved cold start performance, the system preferably including a main pipe connected to a purge gas outlet of a fuel cell stack to discharge a purge gas purging the fuel cell stack and impurities; an auxiliary pipe branched from the main pipe; a purge valve suitably installed in each of the main pipe and the auxiliary pipe to perform an purge operation; a cut-off valve suitably installed at an upstream side of the purge valve in the auxiliary pipe; and a controller for suitably controlling the operation of the purge valves and the cut-off valve.

In another preferred embodiment, the main pipe may be a hydrogen discharge line that is suitably connected to an anode outlet of the fuel cell stack to discharge hydrogen and impurities by a hydrogen purge.

In another preferred embodiment, the controller may operate the purge valve of the main pipe to purge the fuel cell stack during operation of the fuel cell and maintain the cut-off valve in a closed state such that the purge valve of the auxiliary pipe is suitably maintained in a dry state.

In still another preferred embodiment, the controller may maintain the purge valve of the main pipe in a closed state and maintain the cut-off valve in an opened state when the fuel cell is shut down.

In yet another preferred embodiment, the controller may operate the purge valve of the auxiliary pipe to purge the fuel cell stack during cold start-up after shutdown of the fuel cell.

In still yet another preferred embodiment, the purge system may preferably include a heater to thaw each of the cut-off valve of the auxiliary pipe and the purge valve of the main pipe while the purge valve of the auxiliary pipe performs the purge operation during the cold start-up.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Reference numerals set forth in the Drawings includes reference to the following elements as further discussed below:

| 1: fuel cell stack | 11: main pipe |
|---|---|
| 12: main purge valve | 13: heater |
| 21: auxiliary pipe | 22: cut-off valve |
| 23: heater | 24: auxiliary purge valve |
| 25: mesh membrane | |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

According to a preferred aspect of the present invention, a purge system for a fuel cell with improved cold start performance, the system comprising a main pipe connected to a purge gas outlet of a fuel cell stack, an auxiliary pipe branched from the main pipe, a purge valve, a cut-off valve; and a controller.

In one embodiment, the main pipe discharges a purge gas purged from the fuel cell stack and impurities.

In another embodiment, the purge valve performs an purge operation.

In another further embodiment, the cut-off valve is installed at an upstream side of the purge valve in the auxiliary pipe.

In another embodiment, the controller controls the operation of the purge valves and the cut-off valve.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention as described herein provides a purge system for a fuel cell, which can suitably reduce the time required to thaw a frozen valve during cold start-up and reduce the whole start-up time, thus suitably improving the cold start performance.

Figure 2:
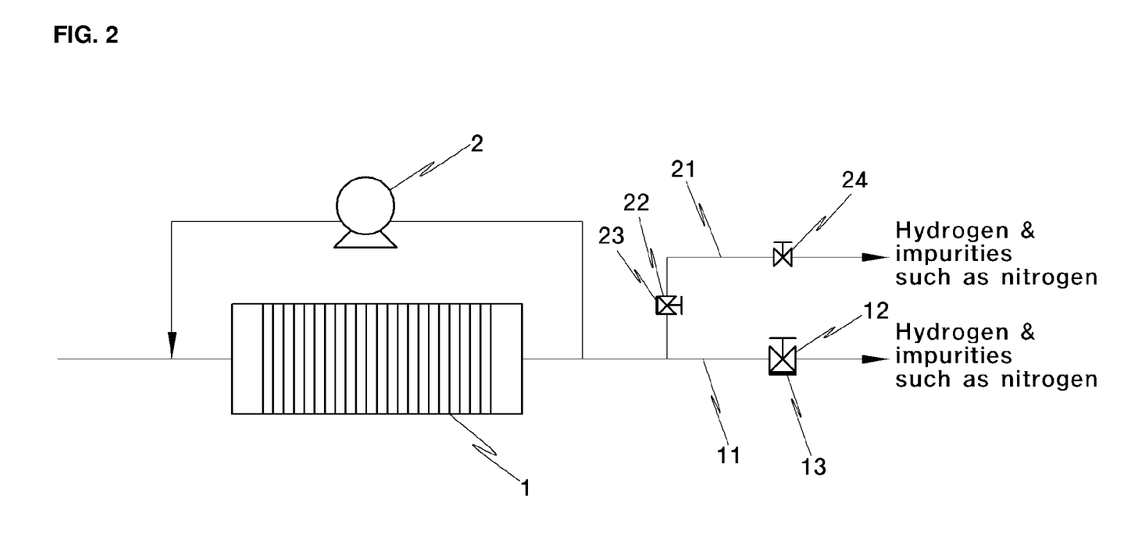
FIG. 2 is a schematic diagram of a purge system in accordance with an exemplary embodiment of the present invention.

FIG. 2 is a schematic diagram of a purge system in accordance with an exemplary embodiment of the present invention.

According to preferred embodiments, the purge system of the present invention includes a main pipe 11 preferably connected to a purge gas outlet of a fuel cell stack 1 to suitably discharge a purge gas purging the fuel cell stack 1 and impurities from the fuel cell stack 1, an auxiliary pipe 21 branched from the main pipe 11, purge valves 12 and 24 suitably installed in the main pipe 11 and the auxiliary pipe 21, respectively, to perform a purge operation, a cut-off valve 22 suitably installed at the upstream side of the purge valve 24 in the auxiliary pipe 21, and a controller (not shown) for controlling the operation of the purge valves 12 and 24 and the cut-off valve 22.

According to certain embodiments of the present invention, in the purge system of FIG. 2, the main pipe 11 for hydrogen purge and the auxiliary pipe 21 branched from the main pipe 11 are provided, and the purge valves 12 and 24 are suitably installed in the main pipe 11 and the auxiliary pipe 21, respectively.

Preferably, the main pipe 11 is an existing hydrogen discharge line, suitably connected to a hydrogen outlet of the fuel cell stack 1, i.e., an anode outlet. According to certain preferred embodiments, during hydrogen purge operation at which a flow path of the main pipe 11 is opened by the opening of the purge valve 12, hydrogen as a purge gas and impurities such as nitrogen are suitably discharged from the fuel cell stack 1 through the main pipe 11.

Preferably, the auxiliary pipe 21 is a newly installed pipe in the present invention, which is suitably branched from the main pipe 11 as the existing hydrogen discharge line. During the hydrogen purge operation at which a flow path of the auxiliary pipe 21 is suitably opened by the opening of the purge valve 24, hydrogen as a purge gas and impurities such as nitrogen are suitably discharged from the fuel cell stack 1 through the auxiliary pipe 21.

Preferably, the purge valve 24 suitably installed in the auxiliary pipe 21 will be referred to as an auxiliary purge valve and the purge valve 12 installed in the main pipe 11 will be referred to as a main purge valve.

According to further preferred embodiments of the present invention, while the main purge valve 12 (i.e., existing hydrogen purge valve) is the one used in the existing fuel cell system, the cut-off valve 22 is a newly installed valve together with the auxiliary pipe 21 and the auxiliary purge valve 24. Preferably, the cut-off valve 22 is an electronic valve which is suitably opened and closed in response to a control signal of the controller to open and close the flow path of the auxiliary pipe 21.

According to certain preferred embodiments, the auxiliary purge valve 24 is suitably installed at the downstream side of the cut-ff valve 22 in the auxiliary pipe 21 and is also an electronic valve to open and close the flow path of the auxiliary pipe 21 in response to a control signal of the controller for the purge operation, like the main purge valve 12 which opens and close the flow path of the main pipe 11 during the purge operation.

Preferably, since the auxiliary pipe 21 in the above-described purge system is a pipe through which hydrogen as a purge gas is suitably discharged only during the cold start-up, it is possible to use a small pipe as the auxiliary pipe 21, and it is also possible to use small valves as the cut-off valve 22 and the auxiliary purge valve 24.

According to other further preferred embodiments, the cut-off valve 22 located adjacent to the fuel cell stack 1 is suitably maintained in an opened state during cold shutdown, at which the fuel cell system is shut down at a temperature below the freezing point, and the auxiliary purge valve 24 adjacent to the outside air is suitably maintained in a closed state during the cold shutdown.

According to other further preferred embodiments, since the auxiliary purge valve 24 installed at the downstream side of the auxiliary pipe 21 is suitably maintained in a dry state, there is no necessity to provide a heater for thawing the auxiliary purge valve 24. However, in other further embodiments, the cut-off valve 22 located adjacent to the outlet of the fuel cell stack 1 is exposed to a wet environment during operation of the fuel cell, and thus a heater 23 for thawing the cut-off valve 22 during the cold start-up may be provided.

In other embodiments of the present invention, the cut-off valve 22 is always suitably maintained in an opened state when the fuel cell is shut down and is closed in a normal operation of the fuel cell during start-up, and thus it is necessary to thaw the cut-off valve 22 to switch to a closed state after the fuel cell reaches a normal operation state under cold start conditions.

Accordingly, it is necessary to provide a heater 23 to thaw the cut-off valve 22 during the cold start-up, and the heater 23 for the cut-off valve 22 may have a capacity smaller than that of a heater 13 for the main purge valve 12.

In an exemplary embodiment, the auxiliary purge valve 24 may preferably be located in a higher position than the other in the auxiliary pipe 21 to prevent the water present in the pipe from being collected in the auxiliary purge valve 24 by gravity.

Preferably, in certain embodiments, the auxiliary purge vale 24 is located in a higher position than the cut-off valve 22 in the auxiliary pipe 21 such that the water does not flow in the auxiliary purge valve 24 and, if possible, the auxiliary purge valve 24 is located in the highest position in the auxiliary pipe 21.

The main purge valve 12, the cut-off valve 22, and the auxiliary purge valve 24 are described in terms of their functions according to preferred embodiments of the present invention herein below. According to certain preferred embodiments, the main purge valve 12 suitably performs the hydrogen purge during normal operation of the fuel cell, and the cut-off valve 22 suitably cuts off the auxiliary pipe 21 at the upstream side thereof during the normal operation of the fuel cell, thus suitably maintaining the auxiliary purge valve 24 located at the downstream side of the auxiliary pipe 21 in a dry state.

According to other further preferred embodiments, the cut-off valve 22 cuts off the flow path of the auxiliary pipe 21 during the operation of the fuel cell such that the hydrogen purge (to discharge hydrogen as a purge gas and impurities) through the main pipe 11 is normally performed.

In further preferred embodiments, since the cut-off valve 22 is suitably exposed to a wet environment together with the main purge valve 12 during the operation of the fuel cell, it is suitably maintained in an opened state on the contrary to the closed state of the main purge valve 12 such that even when the freezing occurs during the cold shutdown, the cut-off valve 22 is frozen while the flow path is in an opened state.

Preferably, the auxiliary purge valve 24 is maintained in a dry state by the cut-off valve 22 cutting off the auxiliary pipe 21 during the operation of the fuel cell. However, during the cold start-up, the auxiliary purge valve 24 performs the purge operation for the hydrogen purge of the fuel cell stack 1 while the main purge valve 12 in a closed state is thawed during the cold start-up. That is, the auxiliary purge valve 24 is to perform the actual purge function in the auxiliary pipe 21.

The operation of the purge system in accordance with preferred exemplary embodiments of the present invention is described with reference to Table 1.

tained in a closed state, and the auxiliary purge valve 24 in a dry state may be suitably maintained in an opened state.

Accordingly, the cut-off valve 22 is opened during the cold shutdown and closed during the normal shutdown. However, according to further preferred embodiments of the present invention, when the temperature falls below the freezing point after the normal shutdown, the cut-off valve 22 may be

TABLE 1

| Condition | Main purge valve | Cut-off valve | Auxiliary purge valve | State |
|---|---|---|---|---|
| Normal operation | Purge-Opened | Closed | Opened | Purge operation of main purge valve while cut-off valve is in closed state<br>Perform hydrogen purge through main pipe |
| Cold shutdown | Closed (wet) | Opened (wet) | Closed (dry) | Cut off flow paths of main pipe and auxiliary pipe |
| Cold start-up | Closed (thawing) | Closed (thawing) | Purge-Opened | Purge operation of auxiliary purge valve while cut-off valve is in opened state<br>First perform hydrogen purge through auxiliary pipe (vehicle can be driven immediately after start-up |
| Normal operation after cold start up | Purge-opened | Closed | Opened | Maintain auxiliary purge valve in dry state by closing cut-off valve<br>Purge operation of main purge valve<br>Perform hydrogen purge through main pipe |

First, in a normal operation of the fuel cell, the hydrogen purge is suitably performed only through the main pipe 11 in a state where the auxiliary pipe 21 is cut off.

Accordingly, during the normal operation, the hydrogen purge is preferably performed by the purge operation of the main purge valve 12 installed in the main pipe 11 in a state where the cut-off valve 22 installed in the auxiliary pipe 21 is suitably maintained in a closed state and the auxiliary purge valve 24 is suitably maintained in an opened state.

Preferably, the purge operation of the main purge valve 12 may be performed in a pulse purge manner, in which the main purge valve 12 is repeatedly opened and closed in response to a control signal of the controller, to suitably discharge hydrogen as a purge gas and impurities such as nitrogen only through the main pipe 11 in the same manner as the prior art.

Accordingly, during the operation of the fuel cell, while the insides of the main purge valve 12 and the cut-off valve 22 are preferably exposed to a wet environment, the auxiliary purge valve 24 is suitably maintained in a dry state because the cut-off valve 22 at the upstream side of the auxiliary purge valve 24 closes the flow path of the auxiliary pipe 21.

Further, during the cold shutdown, at which the fuel cell system is shut down at a temperature below the freezing point, the main purge valve 12 in a wet state is preferably maintained in a closed state to cut off the flow path of the main pipe 11, and the cut-off valve 22 in the auxiliary pipe 21 also in a wet state is opened and, instead, the auxiliary purge valve 24 in a dry state is closed to cut off the flow path of the auxiliary pipe 21.

Preferably, the controller detects the shutdown from an input key signal and detects the temperature below the freezing point, i.e., the cold shutdown, from a value detected by a temperature sensor (not shown), thus controlling the respective valves.

In still other embodiments of the present invention, during the normal shutdown, at which the fuel cell system is shut down at a temperature above the freezing point, the flow paths of the main pipe 11 and the auxiliary pipe 21 may be suitably maintained in a closed state. Here, the main purge valve 12 and the cut-off valve 22 in a wet state may be suitably main-frozen in a closed state. Accordingly, the cut-off valve 22 may be always maintained in an opened state when the fuel cell system is shut down, regardless of the cold shutdown and the normal shutdown.

In further preferred embodiments, when the cold start-up process is initiated by starting the fuel cell system at a temperature below the freezing point, the hydrogen purge is preferably performed only through the auxiliary pipe 21 in a state where the flow path of the main pipe 11 is cut off.

Preferably, when detecting the start-up from an input key signal and detecting the temperature below the freezing point, i.e., the cold start-up, from a value detected by the temperature sensor, the controller operates the heaters 13 and 23 to thaw the main purge valve 12 of the main pipe 11 and the cut-off valve 22 of the auxiliary pipe 21 such that the hydrogen purge is first performed by the purge operation of the auxiliary purge valve 24 installed in the auxiliary pipe 21.

Accordingly, in further preferred embodiments, since the cut-off vale 22 is in an opened state while the main purge valve 12 is in a closed state, the fuel cell stack 1 can be suitably purged by the purge operation of the auxiliary purge valve 24. Preferably, since the fuel cell system is shut down while the auxiliary purge valve 24 is not exposed to a wet environment but is always maintained in a dry state by the cut-off valve 22 in a closed state during the operation of the fuel cell, no freezing occurs even at a temperature below the freezing point, and thus no thawing process by the heaters is required.

In further preferred embodiments of the present invention, the purge operation of the auxiliary purge valve 24 may be performed in a pulse purge manner, in which the auxiliary purge valve 24 is repeatedly opened and closed in response to a control signal of the controller, to suitably discharge hydrogen as a purge gas and impurities such as nitrogen through the auxiliary pipe 21.

Preferably, the valves, which are exposed to a wet environment and frozen after the fuel cell system is shutdown, are suitably thawed during the cold the start-up without any operation, and during the thawing process, the hydrogen purge is suitably performed through the auxiliary pipe 21 and the auxiliary purge valve 24 to discharge impurities such as nitrogen at the anode of the fuel cell stack 1, and thereby the vehicle can be driven immediately after the start-up.

Preferably, it is possible to start and drive the vehicle using the auxiliary purge valve 24 in a dry state, not waiting until the main purge valve 12 is suitably thawed, and it is thus possible to overcome any possible drawbacks wherein the start-up time is increased by the thawing process of the frozen valves, which results in a reduction in start-up time and improvement in cold start performance.

In further preferred embodiments, when both the main purge valve 12 and the cut-off valve 22 are thawed after the lapse of a predetermined time and thereby the fuel cell system is normally operated, the hydrogen purge is performed through the main pipe 11.

Accordingly, the controller closes the cut-off valve 22 to cut off the flow path of the auxiliary pipe 21 at the upstream side thereof such that the auxiliary purge valve 24 is not suitably exposed to a wet environment, thus maintaining the auxiliary purge valve 24 in a dry state.

Although the auxiliary purge valve 24 may be suitably maintained in an opened state or in a closed state during the operation of the fuel cell, the cut-off vale 22 should switch to an opened state during the cold shutdown of the fuel cell, and thus the auxiliary purge valve 24 is maintained in a closed state to close the flow path of the auxiliary pipe 21.

Figure 3:
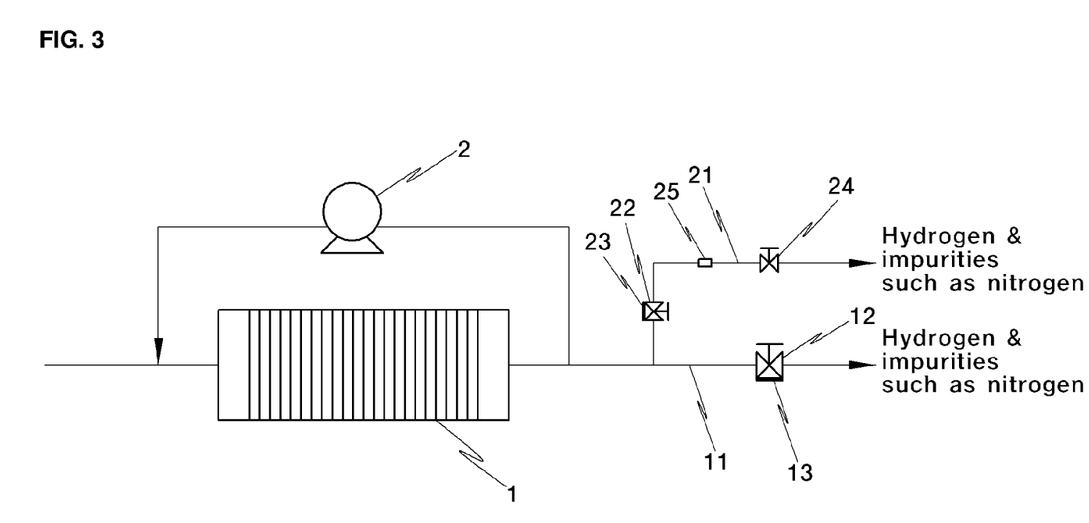
FIGS. 3 and 4 are schematic diagrams of a purge system in which a mesh membrane is installed in an auxiliary pipe in accordance with an exemplary embodiment of the present invention.
Figure 4:
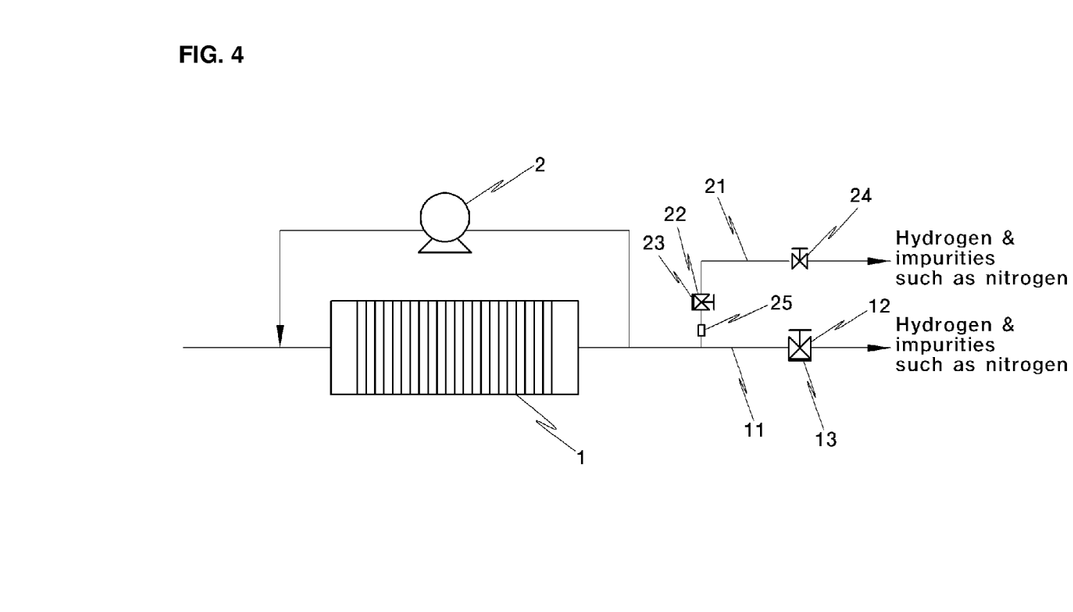
Figure 5:
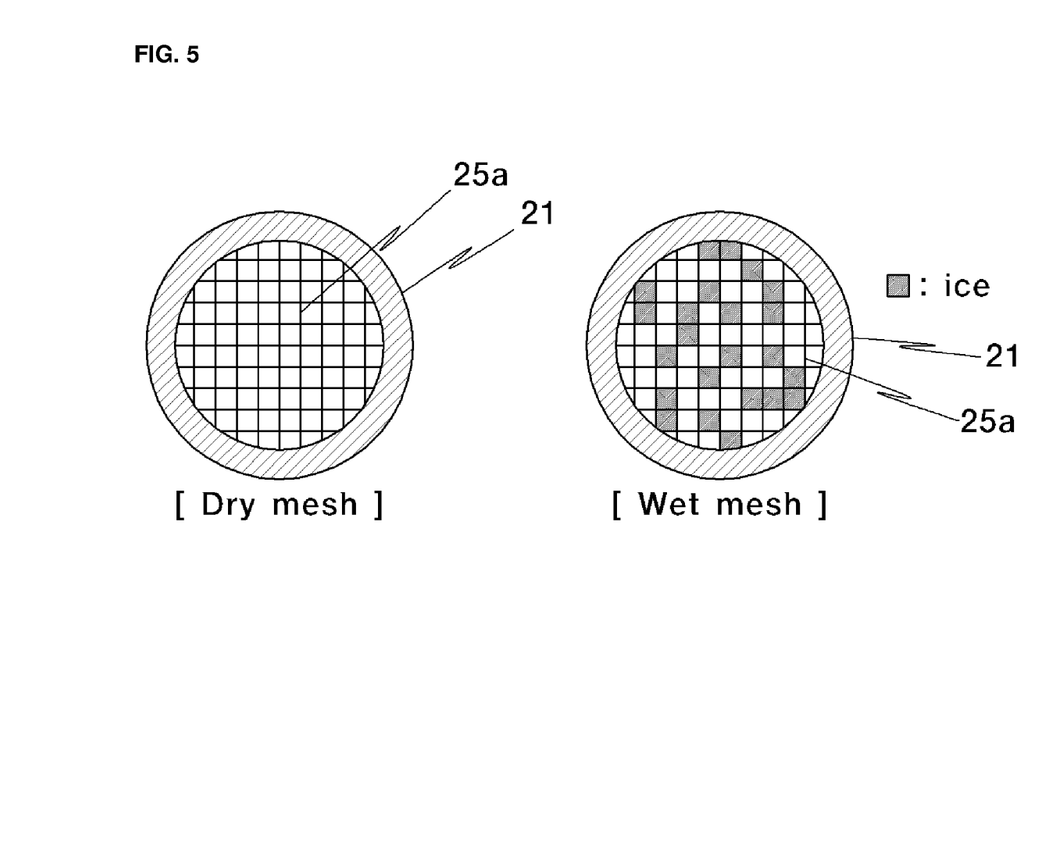
FIG. 5 is a diagram showing dry and wet states of the mesh membrane installed in the auxiliary pipe in FIGS. 3 and 4.

In other exemplary embodiments, for example as shown in FIGS. 3 and 4, FIGS. 3 and 4 are schematic diagrams of a purge system in which a mesh membrane is suitably installed in the auxiliary pipe in accordance with an exemplary embodiment of the present invention, and FIG. 5 is a diagram showing dry and wet states of the mesh membrane installed in the auxiliary pipe in FIGS. 3 and 4.

As shown in the figures, for example, the mesh membrane 25 including a mesh net 25a may be located in a position between the cut-off valve 22 and the auxiliary purge valve 24 in the auxiliary pipe 21 or at the upstream side of the cut-off valve 22.

Preferably, the mesh membrane 25 suitably prevents the water in the main pipe 11, which flows to the auxiliary pipe 21 against the force of gravity due to a difference in concentration after the shutdown, from moving upward to the cut-off valve 22 and the auxiliary purge valve 24, thus suitably maintaining the auxiliary purge valve 24 in a drier state.

In further preferred embodiments, only when the auxiliary purge valve 24 is suitably maintained in a dry state during the shutdown, no freezing occurs in the auxiliary purge valve 24, and thus it is easily opened during the next cold start-up. However, since the cut-off valve 22 is in an opened state during the shutdown, the water flowing from the main pipe 11 may move upward to the auxiliary purge valve 24.

Accordingly, it is necessary to suitably prevent the auxiliary purge vale 24, which should be maintained in a dry state after the shutdown, from being in a wet state by the water flowing from the main pipe 11, and thus the mesh membrane 25 prevents the water from moving to the auxiliary purge valve 24 in the auxiliary pipe 21.

Preferably, according to other further preferred embodiments, the water moving upward from the main pipe 11 to the auxiliary pipe 21 is first collected in the mesh membrane 25 and then is frozen in the mesh net 25a of the mesh membrane 25 at a temperature below the freezing point as shown in the right of FIG. 5.

Further, when the hydrogen purge is preferably performed through the auxiliary pipe 21 during the cold start-up, the hydrogen and impurities pass through the mesh membrane 25 to break the ice clung to the mesh net 25a, and thereby the ice crystals separated from the mesh net 25a are discharged through the pipe.

Accordingly, the mesh membrane 25 suitably collects the water moving upward from the main pipe 11 to the auxiliary pipe 21 to prevent the water from moving to the auxiliary purge valve 24 during the shutdown, and thereby the auxiliary purge valve 24 is suitably maintained in a drier state, which prevents the auxiliary purge valve 24 from freezing. As a result, it is possible to supply hydrogen through the purge operation during the cold start-up without thawing the auxiliary purge valve 24.

Preferably, since the mesh membrane 25 should endure the pressure of the fluid during the hydrogen purge and the water should be collected in the mesh membrane 25, the mesh membrane 25 may have a mesh size of 1 to 3 mm.

Preferably, although the mesh membrane 25 is installed between the cut-off valve 22 and the auxiliary purge valve 24 as shown in FIG. 3, the mesh membrane 25 may preferably be located at the upstream side of the cut-off valve 22 so as to prevent the water from moving even to the cut-off valve 22 after the shutdown as shown in FIG. 4.

As described herein, according to the purge system of the present invention, in which an auxiliary pipe is provided separately from the main pipe and an auxiliary purge valve, which is suitably maintained in a dry state during operation of the fuel cell, is used to purge the fuel cell stack during cold start-up of the fuel cell, it is possible to reduce the time required to thaw a frozen valve during cold start-up and reduce the whole start-up time, thus improving the cold start performance.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A purge system for a fuel cell with improved cold start performance, the system comprising:
   a main pipe connected to a purge gas outlet of a fuel cell stack to discharge a purge gas purged from the fuel cell stack and impurities;
   an auxiliary pipe branched from the main pipe;
   a purge valve installed in each of the main pipe and the auxiliary pipe to perform a purge operation;
   a cut-off valve installed at an upstream side of the purge valve in the auxiliary pipe; and
   a controller configured to control operation of the purge valves and the cut-off valve, wherein the controller is configured to operate the purge valve of the main pipe to purge the fuel cell stack during operation of the fuel cell and maintain the cut-off valve in a closed state so that the purge valve of the auxiliary pipe is maintained in a dry state during operation of the fuel cell.

2. The system of claim 1, wherein the main pipe is a hydrogen discharge line connected to an anode outlet of the fuel cell stack to discharge hydrogen and impurities by a hydrogen purge.

3. The system of claim 1, wherein the controller maintains the purge valve of the main pipe in a closed state and maintains the cut-off valve in an opened state when the fuel cell is shut down.

4. The system of claim 3, wherein the controller operates the purge valve of the auxiliary pipe to purge the fuel cell stack during cold start-up after shutdown of the fuel cell.

5. The system of claim 4, further comprising a heater to thaw each of the cut-off valve of the auxiliary pipe and the purge valve of the main pipe while the purge valve of the auxiliary pipe performs the purge operation during the cold start-up.

6. The system of claim 1, wherein the cut off valve is installed on an upstream side of the purge valve in the auxiliary pipe so that water present in the auxiliary pipe is collected in the purge valve of the auxiliary pipe by gravity.

7. The system of claim 1, further comprising a mesh membrane for collecting water configured to include a mesh net and installed at an upstream side of the purge valve of the auxiliary pipe.

8. The system of claim 1, wherein a mesh membrane is installed between the cut-off valve and the purge valve of the auxiliary pipe or at an upstream side of the cut-off valve.

\* \* \* \* \*